2,934,482
Patented Apr. 26, 1960

2,934,482
NUCLEAR REACTOR FUEL ELEMENT AND METHOD OF MANUFACTURE

Harvey Brooks, Cambridge, Mass., assignor to the United States of America as represented by the United States Atomic Energy Commission No Drawing. Application September 7, 1950
Serial No. 183,655

2 Claims. (Cl. 204—193.2)

This invention relates to bimetallic compacts and a process for forming them. More particularly it relates to compacts of plutonium or uranium or their compounds and a binding agent of a lighter metal.

The development of nuclear reactors operated as intermediate or fast reactors, that is, wherein the average neutron energy is above about 30,000 electron volts has given rise to problems in the manner of the incorporation of the fissionable material. If these reactors are to be operated at relatively high power levels, the elements in which the fissionable material is incorporated, the so-called "fuel elements," must be designed so that the heat generated by the fissions and other heat generating effects may be efficiently transferred to the coolant material passing through the reactor. Another problem arises from the change in the physical characteristics of fissionable material as a result of the fissioning of a portion thereof. These intermediate or fast reactors utilize as the fuel material, plutonium or uranium enriched in respect to the 235 or 233 isotope. It has been found that these materials when in the metallic form tend to disintegrate to a powder after a certain portion of the material has fissioned. It is important, therefore, that the fissionable material be incorporated in a manner that it is not dependent upon itself for support, for a change in the relative location of the fissionable maerial will deleteriously affect the operating characteristics of the reactor. Still another problem is to find a design which will alleviate or mitigate the problem of disposing of gaseous fission products generated during the operation of the reactor.

An object of this invention is to provide structures adapted to use in a nuclear reactor.

A further object is to provide compositions suitable for use in fuel elements of a nuclear reactor.

A still further object is to provide a fuel element for a nuclear reactor which is relatively resistant to radiation damage.

Another object is to provide a fuel element for a nuclear reactor wherein the fissionable material is prevented from undergoing mechanical disintegration.

Other objects will appear hereinafter.

The applicant has found that these several objects are attained by the preparation of compacts wherein the fissionable material is dispersed as finely divided aggregates in a matrix of a dilutant material. The process of preparation consists in hot pressing the mixed powders of the fissionable material and the dilutant material.

Broadly the term fissionable material is used in this application to designate metallic uranium or plutonium and their compounds. To sustain a chain reaction in an intermediate or fast type of reactor, the uranium utilized is necessarily enriched as to the fissionable isotopes of $U^{233}$ or $U^{235}$—the degree of enrichment, however, forms no part of the present invention. The compounds of fissionable material suitable for use in the practice of this invention are those which do not undergo decomposition at the temperature of hot pressing of the compacts. Uranium dioxide and $UAl_2$ are examples of this type of compound.

The selection of the dilutant material is guided by several criteria. If the compact is to be used in an intermediate or fast reactor, the dilutant material must be one having substantially no neutron moderating properties. The dilutant must also have a low neutron adsorption cross section in the energy region at which the reactor is to be operated. The mechanical strength of the dilutant must be relatively good, and it should have a high thermal conductivity. In connection with the last property, it is also desirable that the dilutant form no intermetallic compounds with the fissionable material since these compounds are ceramic like and have a very low thermal conductivity. Their presence would, of course, inhibit the transfer of heat from the fissionable material to the dilutant. Magnesium, calcium and barium which exhibit the above properties serve excellently as the dilutant of the subject invention.

It is known that magnesium and calcium do not alloy with uranium, and there is reason to believe that barium does not. Studies of the compacts prepared in the course of this invention indicate that uranium and magnesium do not form intermetallic compounds, and no evidence of diffusion between the uranium and magnesium could be found. Attempts to form uranium-calcium alloys have proved equally unsuccessful. Observations have not indicated any tendency on the part of plutonium to form alloys or compounds with magnesium or calcium. Since no diffusion or alloying takes place, these materials act merely as a "glue" to the particles of the fissionable materials. Though, of these materials, magnesium is generally to be preferred because of its higher mechanical strength, superior nuclear properties and relative chemical inertness, the higher melting points of calcium and barium are important considerations where reactor operating temperatures above the melting point of magnesium are desired.

As set forth above, the structures of this invention are prepared by hot-pressing a mixture of the powdered components. The fineness of the powders has not been found to be critical. However, to assure that no segregation of the fissionable material occurs, but that good random distribution is obtained, it has been found desirable to have the materials in a fineness of less than 60 mesh, and preferably of from 200 to 300 mesh.

It has been found that the shape of the particles of the fissionable material may affect the heat transfer properties of the compact. The uranium powder used in preparing some of the compacts was in the form of platelets which it was found laid flat in the transverse direction of the compress. This orientation produces a greater cross-sectional area of poorly conducting uranium in a longitudinal direction and decreases the overall heat conductivity in this direction. If more or less equiaxed particles are used, the orientation of the uranium particles is eliminated and the heat conductivity is uniform in all directions.

The hot-pressing should be carried out at a temperature at which the matrix material is practically molten. This insures that the matrix material flows around the particles of fissionable material which then exist as small islands in the matrix. Such a structure is desirable since radiation damage to the fuel element is minimized by the isolation of the individual pieces of the fissionable material in pockets separated by sound matrix material which remains relatively undamaged by the radiation. The compacting may be carried out in a single step wherein heat and pressure are applied simultaneously or the powder may be subjected to an initial pressing while cold and subsequently sintered under pressure. The pressure applied has not been found to be extremely critical, however, pressures of from 1500 pounds per square inch and higher assure maximum density, that is, approaching theoretical density, which is generally desirable.

To protect the components from oxidation during the sintering, the operation should be carried out in an inert atmosphere. A vacuum technique may be used but is less desirable because of the tendency of the matrix materials to distill off at the sintering temperature. Apparatus such as described in C. G. Goetzel, "Treatise on Powder Metallurgy," vol. I, pp. 469–495, Interscience Pub., New York (1949), is suitable for the pressing and sintering operations.

The selection of the die material is dependent upon the result desired. If a body solely of the matrix and fissionable material is desired, a die material that will not react or bond to these substances should be chosen. Graphite has been found satisfactory for this purpose.

A unique and valuable result of the bonding properties was noted, however, in a series of pressings of the compacts in stainless steel containers. Because of its corrosion resistance, stainless steel is a useful material for cladding the fuel element to protect the fissionable material from reaction with the coolant passing through the reactor. The selection of any cladding material, however, is dictated not only by its corrosion resisting properties, but also by the type of bond which it forms with the compact of the fuel material. Since iron and uranium form brittle intermetallic compounds, it appeared that it might not be possible to directly press the compacts within the stainless steel containers. It was discovered, however, that when uranium and magnesium mixtures were pressed in steel tubes, although the dispersion of uranium remained homogeneous showing that the uranium did not segregate, as might be predicted from the large density difference, the uranium did not extend to the walls of the steel tube but a thin ring of magnesium about 1/32 of an inch thick was in contact with the tube. Examination of the bond disclosed it to be purely mechanical and subsequent testing proved that the steel-magnesium bond was strong mechanically, remained firm through repeated thermal cycling, and had an excellent heat transfer coefficient. It is apparent, therefore, that these properties afford a valuable method for preparing the compacts with a firmly bonded coating of stainless steel. Compacts completely enclosed in stainless steel and firmly bonded to the steel may be prepared by compressing the powder mixture within a stainless steel tube with steel cups placed on the top and bottom of the powder. By hot pressing this setup, a structure will be produced wherein the compact is bonded to the wall of the container and the cups at either end. Complete enclosures may then be obtained by welding the caps to the tubing. Alternatively the pressing may be carried out in a stainless steel tube having a single open end using in this instance a cap of stainless steel at the open end.

Specific examples of the practice of this invention are set forth below.

*Example I*

An 8.8 gram mixture of 20 volume percent uranium powder of minus 60 mesh and 80 volume percent magnesium powder of approximately the same fineness was placed in a 3/4" I.D. stainless steel tube. Pressure was applied by stainless steel plungers oxidized and coated with Aquadag. The mixture was first cold pressed at 1500 pounds per square inch. After release of this pressure the compact was heated to 650° C. in eleven minutes. A pressure of 2000 pounds per square inch was then applied and the temperature maintained at 650° C. for fifteen minutes. The heating was then stopped, the compact was cooled to 575° C. and the pressure released.

The density of the completed compact was 5.19 grams per cubic centimeter. The compact appeared to be firmly bonded to the stainless steel tube and upon pulling the tube off of the compact, part of the outer layer of the compact came off with the tube showing excellent bonding.

*Example II*

A mixture of powders containing 42% uranium by volume was pressed under conditions substantially the same as in Example I. A compact of desirable quality was formed although it was observed that the bonding to the stainless steel tubing was somewhat impaired due to the decreased amount of magnesium.

*Example III*

Using magnesium powder, a one inch long pressing was made in a 3/4 inch stainless steel tube using graphite punches with steel cups on the top and bottom of the powder. This mixture was pressed at 650° C. and 2000 pounds per square inch. The tube with the magnesium bonded therein was thermal-cycled between 100° and 500° C. No change was observed in the dimensions of the tube and microexamination of the bond revealed it to be unimpaired. No trace of alloying between the stainless steel and magnesium could be seen.

Continued operation of a neutronic reactor inherently results in the depletion of the fissionable material which was initially incorporated in the reactor. The destruction of the fissionable material is, however, in no manner complete when it becomes profitable to move the fuel elements depleted with respect to the fissionable material contained therein and replace them with new elements. Since fissionable material is only obtained with a high economic cost, it is apparent that it is desirable to recover as much fissionable material as possible that remains in the discarded elements. The elements of this invention afford the use of a simple method of separating the fissionable material and the dilutant. The separation can be obtained by simply distilling off the dilutant material from the relatively non-volatile fissionable material. This procedure eliminates the long, costly and involved chemical separation process.

It is apparent from the foregoing that the present invention provides elements suitable for use in a nuclear reactor and further provides an easy and practical method by which they may be prepared.

I claim:

1. A fuel element for a nuclear reactor comprising a body consisting of from 20% to 42% by volume of finely divided uranium dispersed in a matrix of magnesium metal, a stainless steel jacket enclosing said body and a bonding layer of magnesium interposed between said body and said jacket.

2. The method of forming a fuel element for a nuclear reactor comprising a stainless steel container, a body of finely divided uranium dispersed in a matrix of magnesium within said container and a bonding layer of magnesium metal between said container and said body which comprises placing a mixture of from 20% to 42% by volume of finely divided uranium and finely divided magnesium within a stainless steel container and heating to a temperature between about 630° and 650° C. and simultaneously compressing said mixture in contact with said container.

References Cited in the file of this patent

UNITED STATES PATENTS

| 1,422,443 | Hoge | July 11, 1922 |
| 1,902,478 | Wiegand | Mar. 21, 1933 |

FOREIGN PATENTS

| 14,762 | Great Britain | of 1909 |
| 861,390 | France | Feb. 7, 1941 |

(Other references on following page)

OTHER REFERENCES

"Treatise on Powder Metallurgy," by Goetzel (1949), vol. 1, pages 436–468; published by Interscience Publishers, Inc., N.Y.

Friend: "Textbook of Inorganic Chemistry," vol. VII, part III, page 278 (1926); publ. by Charles Griffin & Co., Ltd., London Chipman: "Metallurgy in the Development of Atomic Power," USAEC Document MDDC-539, dated October 1946, declassified Nov. 25, 1946 (entire document 20 pages), pages 15 and 16 especially relied upon.

Goodman: "The Science and Engineering of Nuclear Power," vol. 1, pages 300–303, 319 (1947); publ. by Addison-Wesley Press, Inc., Cambridge 42, Mass.; also pages 304 and 305.